US007774276B1

(12) United States Patent
Leonardo et al.

(10) Patent No.: US 7,774,276 B1
(45) Date of Patent: Aug. 10, 2010

(54) METHOD AND SYSTEM FOR DEALING WITH NON-PAYING BIDDERS RELATED TO NETWORK-BASED TRANSACTIONS

(75) Inventors: Lou Leonardo, Aptos, CA (US); Randy Ching, Mountain View, CA (US); Amanda Wahl, Santa Cruz, CA (US)

(73) Assignee: eBay Inc., San Jose, CA (US)

( * ) Notice: Subject to any disclaimer, the term of this patent is extended or adjusted under 35 U.S.C. 154(b) by 1718 days.

(21) Appl. No.: 09/717,433

(22) Filed: Nov. 20, 2000

(51) Int. Cl.
*G06Q 40/00* (2006.01)

(52) U.S. Cl. ...................................................... 705/40

(58) Field of Classification Search .................. 705/14, 705/26, 27, 35–40, 13, 15, 1
See application file for complete search history.

(56) References Cited

U.S. PATENT DOCUMENTS

| | | | |
|---|---|---|---|
| 3,573,747 A | 4/1971 | Adams et al. | 340/172.5 |
| 3,581,072 A | 5/1971 | Nymeyer | 235/152 |
| 3,687,256 A | 8/1972 | Jones | |
| 4,412,287 A | 10/1983 | Braddock, III | 364/408 |
| 4,674,044 A | 6/1987 | Kalmus et al. | 364/408 |
| 4,677,552 A | 6/1987 | Sibley, Jr. | 364/408 |
| 4,789,928 A | 12/1988 | Fujisaki | 364/401 |
| 4,799,156 A | 1/1989 | Shavit et al. | 364/401 |
| 4,823,265 A | 4/1989 | Nelson | 364/408 |
| 4,903,201 A | 2/1990 | Wagner | 364/408 |
| 4,992,940 A | 2/1991 | Dworkin | |
| 5,063,507 A | 11/1991 | Lindsey et al. | 364/408 |
| 5,077,665 A | 12/1991 | Silverman et al. | 364/408 |
| 5,101,353 A | 3/1992 | Lupien et al. | 364/408 |
| 5,136,501 A | 8/1992 | Silverman et al. | 364/408 |
| 5,168,446 A | 12/1992 | Wiseman | 364/408 |
| 5,205,200 A | 4/1993 | Wright | 91/1 |
| 5,243,515 A | 9/1993 | Lee | 364/408 |
| 5,258,908 A | 11/1993 | Hartheimer et al. | 364/408 |
| 5,280,305 A | 1/1994 | Monroe | |
| 5,280,422 A | 1/1994 | Moe et al. | 64/140 |

(Continued)

FOREIGN PATENT DOCUMENTS

CA        2253543        10/1997

(Continued)

OTHER PUBLICATIONS

Webpage from www.ebay.com dated Nov. 1999.*

(Continued)

*Primary Examiner*—Hani Kazimi
*Assistant Examiner*—Abhishek Vyas
(74) *Attorney, Agent, or Firm*—Schwegman, Lundberg & Woessner, P.A.

(57) ABSTRACT

A method and system for dealing with non-paying bidders related to network-based transactions in which a submission of a complaint to a network-based facility is facilitated. The complaint is related to a party who has failed to complete a transaction. A resolution of the complaint is facilitated. A record associated with the part is updated if the complaint is not resolved. The record indicates a count of failed transactions related to the party. A submission of a refund request can also be facilitated if the complaint is not resolved.

35 Claims, 21 Drawing Sheets

U.S. PATENT DOCUMENTS

| | | | |
|---|---|---|---|
| 5,283,731 A | 2/1994 | Lalonde et al. | |
| 5,285,383 A | 2/1994 | Lindsey et al. | |
| 5,297,031 A | 3/1994 | Gutterman et al. | 364/408 |
| 5,297,032 A | 3/1994 | Trojan et al. | 364/408 |
| 5,305,200 A | 4/1994 | Hartheimer et al. | 364/408 |
| 5,325,297 A | 6/1994 | Bird et al. | 364/419.07 |
| 5,329,589 A | 7/1994 | Fraser et al. | 379/91 |
| 5,335,170 A | 8/1994 | Petteruti et al. | |
| 5,345,091 A | 9/1994 | Craig | |
| 5,375,055 A | 12/1994 | Togher et al. | 364/408 |
| 5,383,113 A | 1/1995 | Kight et al. | |
| 5,394,324 A | 2/1995 | Clearwater | 64/402 |
| 5,402,336 A | 3/1995 | Spiegelhoff et al. | |
| 5,424,944 A | 6/1995 | Kelly | |
| 5,426,281 A | 6/1995 | Abecassis | 235/379 |
| 5,453,926 A | 9/1995 | Stroschin et al. | |
| 5,521,815 A | 5/1996 | Rose, Jr. | |
| 5,526,479 A | 6/1996 | Barstow et al. | |
| 5,553,145 A | 9/1996 | Micali | 380/30 |
| 5,592,375 A | 1/1997 | Salmon et al. | |
| 5,640,569 A | 6/1997 | Miller et al. | 395/729 |
| 5,664,111 A | 9/1997 | Nahan et al. | |
| 5,664,115 A | 9/1997 | Fraser | 705/37 |
| 5,675,784 A | 10/1997 | Maxwell et al. | |
| 5,689,652 A | 11/1997 | Lupien et al. | 395/237 |
| 5,708,780 A | 1/1998 | Levergood et al. | |
| 5,710,889 A | 1/1998 | Clark et al. | 395/244 |
| 5,715,314 A | 2/1998 | Payne et al. | |
| 5,715,402 A | 2/1998 | Popolo | 395/237 |
| 5,717,989 A | 2/1998 | Tozzoli et al. | 705/37 |
| 5,727,165 A | 3/1998 | Ordish et al. | 395/237 |
| 5,790,790 A | 8/1998 | Smith et al. | |
| 5,794,207 A | 8/1998 | Walker et al. | |
| 5,794,219 A | 8/1998 | Brown | 20/96 |
| 5,802,502 A * | 9/1998 | Gell et al. | 705/37 |
| 5,818,914 A | 10/1998 | Fujisaki | 379/93.12 |
| 5,825,896 A | 10/1998 | Leedom | |
| 5,826,241 A | 10/1998 | Stein et al. | |
| 5,826,244 A | 10/1998 | Huberman | 705/37 |
| 5,835,896 A | 11/1998 | Fisher et al. | 705/37 |
| 5,845,265 A | 12/1998 | Woolston | |
| 5,845,266 A | 12/1998 | Lupien et al. | 705/37 |
| 5,850,442 A | 12/1998 | Muftic | 26/96 |
| 5,878,139 A | 3/1999 | Rosen | |
| 5,895,450 A | 4/1999 | Sloo | |
| 5,913,040 A | 6/1999 | Rakavy et al. | |
| 6,041,308 A * | 3/2000 | Walker et al. | 705/14 |
| 6,047,264 A | 4/2000 | Fisher et al. | |
| 6,049,785 A | 4/2000 | Gifford | |
| 6,061,448 A | 5/2000 | Smith et al. | |
| 6,085,176 A | 7/2000 | Woolston | |
| 6,119,137 A | 9/2000 | Smith et al. | |
| 6,178,408 B1 | 1/2001 | Copple et al. | |
| 6,192,407 B1 | 2/2001 | Smith et al. | |
| 6,202,051 B1 | 3/2001 | Woolston | |
| 6,243,691 B1 | 6/2001 | Fisher et al. | |
| 6,336,095 B1 | 1/2002 | Rosen | |
| 6,415,264 B1 * | 7/2002 | Walker et al. | 705/26 |
| 6,510,418 B1 * | 1/2003 | Case et al. | 705/26 |
| 6,535,856 B1 * | 3/2003 | Tal | 705/1 |
| 6,587,838 B1 * | 7/2003 | Esposito et al. | 705/26 |
| 6,598,026 B1 * | 7/2003 | Ojha et al. | 705/26 |
| 6,766,307 B1 | 7/2004 | Israel et al. | |
| 6,850,918 B1 | 2/2005 | Burchetta et al. | |
| 6,856,984 B2 | 2/2005 | Slaikeu | |
| 6,954,741 B1 | 10/2005 | Burchetta et al. | |
| 7,020,634 B2 | 3/2006 | Khaishgi et al. | |
| 2001/0034635 A1 | 10/2001 | Winters et al. | |
| 2001/0041993 A1 | 11/2001 | Campbell | |
| 2001/0047332 A1 | 11/2001 | Gonen-Friedman et al. | |
| 2001/0053967 A1 | 12/2001 | Gordon et al. | |
| 2002/0007283 A1 | 1/2002 | Anelli | |
| 2002/0010591 A1 | 1/2002 | Pomerance | |
| 2002/0010634 A1 | 1/2002 | Roman et al. | |
| 2002/0035528 A1 | 3/2002 | Simpson et al. | |
| 2002/0069182 A1 | 6/2002 | Dwyer | |
| 2002/0143711 A1 | 10/2002 | Nassiri | |
| 2004/0059596 A1 * | 3/2004 | Vaidyanathan et al. | 705/1 |
| 2004/0128155 A1 | 7/2004 | Vaidyanathan et al. | |
| 2004/0148234 A1 | 7/2004 | Gonen-Friedman et al. | |
| 2004/0267559 A1 | 12/2004 | Hinderer et al. | |
| 2005/0125340 A1 | 6/2005 | Lin et al. | |
| 2005/0246268 A1 | 11/2005 | Foran et al. | |
| 2005/0289039 A1 | 12/2005 | Greak | |
| 2006/0031177 A1 | 2/2006 | Rule | |

FOREIGN PATENT DOCUMENTS

| | | |
|---|---|---|
| FR | 2658635 | 2/1990 |
| NL | 9300266 | 9/1994 |
| WO | WO 92/15174 | 9/1992 |
| WO | WO 96/34356 | 10/1996 |
| WO | WO 97/37315 | 10/1997 |

OTHER PUBLICATIONS

SquareTrade Website. www.squaretrade.com from www.archive. org: May 10, 2000.*

"UAUTOBID.com, Inc. Introduces the Capability to Purchase Specific Vehicles Online." Business Wire. Sep. 13, 1999.*

"eBay: The Feedback Forum", from www.archive.org: Oct. 12, 1999. 5 pages.* eBay Website (www.ebay.com), as existed on Oct. 14, 1999, retrieved from the WayBack Machine (www.archive.org) pp. 1-31.* eBay Website (www.ebay.com), as existed on Oct. 14, 1999, retrieved from the WayBack Machine (www.archive.org) pp1-31.*

Feedback Forum: Wayback Machine; Jan. 16 1999.*

Online Resolution Settles E-Commerce, Business, and Insurance Disputes Online Without Going to Court. (Nov. 8). PR Newswire,1. Retrieved Jan. 16, 2010, from Business Dateline.*

Holiday e-Shoppers to Get Double Assurance as Two Consumer Groups Partner to Promote Safer Shopping On-line. (Nov. 16). PR Newswire,1. Retrieved Jan. 16, 2010, from Business Dateline.*

AUCNET: TV Auction Network System, Harvard Business School, 9-190-001, Apr. 12, 1996, 15 pages.

Thomas W. Malone, Joanne Yates, Robert I. Benjamin, "Electronic Markets and Electronic Hierarchies", Communications of the ACM, Jun. 1987, vol. 30, No. 6, p. 484-497.

Ho Geun Lee, "Electronic Brokerage and Electronic Auction: The Impact of IT on Market Structures", Proceedings of the 29th Annual Hawaii International Conference on System Sciences—1996, p. 397-406.

Eric K. Clemons, Bruce W. Weber, "Evaluating the Prospects for Alternative Electronic Securities Markets", International Conference on Information Systems, 1991, p. 53-61.

Mardesich, Jodi, "Onsale Takes Auction Gavel Electronic", Computer Reseller News, Jul. 8, 1996, 2 pages.

"Personal Optimized Decision/Transaction Program", IBM Technical Disclosure Bulletin, vol. 38, No. 1, Jan. 1995, p. 83-84.

Boon Siong Neo, "The Implementation of an Electronic Market for Pig Trading in Singapore", Journal of Strategic Information Systems, 1992, p. 278-288.

Todd E. Rockoff, Michael Groves, "Design of an Internet-based System for Remote Dutch Auctions", Internet Research, ISSN 1066-2243, vol. 5, No. 4,1995 p. 10-16.

Marcel N. Massimb, Bruce D. Phelps, "Electronic Trading, Market Structure and Liquidity", Financial Analysts Journal, Jan./Feb. 1994, p. 39-50.

"Anonymous Delivery of Goods in Electronic Commerce", IBM Technical Disclosure Bulletin, vol. 39, No. 03, Mar. 1996, p. 363-366.

D. L. Post, S. S. Coppinger, G. B. Sheble, "Application of Auctions as a Pricing Mechanism for the Interchange of Electric Power", IEEE Transactions on Power Systems, vol. 10, No. 3, Aug. 1995, p. 1580-1584.

Christopher M. Hess, Chris F. Kemerer, "Computerized Loan Origination Systems: An Industry Case Study of the Elctronic Markets Hypothesis", MIS Quarterly, Sep. 1994, p. 251-275.

Martin Reck, "Formally Specifying an Automated Trade Execution System", J. Systems Software, 1993, 21, p. 245-252.

Vladimir Zwass, "Electronic Commerce: Structures and Issues", International Journal of Electronic Commerce, vol. 1, No. 1, Fall, 1996, p. 3-23.

Ian Graham, The Emergence of Linked Fish Markets in Europe, Focus Theme, 4 pages.

Ingvar Tjostheim, Jan-Olav Eide, "A Case Study of an On-line Auction for the World Wide Web", 10 pages.

Siegmann, Ken, "Nowhere to Go But Up", PC Week, vol. 12, No. 42, 3 pages.

"Onsale Joins Fray as Online Shopping Picks Up Speed: Internet Booms", Computer Reseller News, Jun. 5, 1995, ISSN 0893-8377, p. 73.

"ONSALE: ONSALE Brings Thrill of Auctions and Bargain Hunting Online; Unique Internet Retail Service Debuts with Week-long Charity Auction for the Computer Museum in Boston", May 24, 1995, 3 pages.

Dr. Beat F. Schmid, "Research Issues, "Electronic Markets, Newsletter of the Competence Centre Electronic Markets, No. 9/10, Oct. 93.

Stefan Klein, "Introduction to Electronic Auctions", University of Munster, Focus Theme, 4 pages.

Efraim Turban, "Auctions and Bidding on the Internet: An Assessment", California State University, Focus Theme, 5 pages.

Eric Van Heck, Pieter M. Ribbers, "Experiences with Electronic Auctions in the Dutch Flower Industry", Focus Theme, 6 pages.

Martin Reck, "Trading-Process Characteristics of Electronic Auctions", Focus Theme, 7 pages.

Ho Geun Lee, "AUCNET: Electronic Intermediary for Used-Car Transactions", Focus Theme, 5 pages.

Kandra, Anne, "Consumer Watch: Resolutions for Smart Buyers", *PC World magazine*, 19(1), (Jan. 2001), pp. 27-30.

Arsenault, Lisa, "Web Wise", *Canadian Insurance*, 103(9), (Aug. 1998), 20-22.

"International Search Report, Application No. PCT/US04/17641, date mailed Mar. 28, 2005", 10 Pages.

Rule, Colin , "Online Dispute Resolution for Business—B2B, E-Commerce, Consumer, Employment, Insurance, and Other Commercial Conflicts", *Online Dispute Resolution for Business, Jossey-Bass, A Wiley Imprint*, (2002),1-326.

"U.S. Appl. No. 09/583,216, Preliminary Amendment filed Oct. 31, 2007", 13 pgs.

"U.S. Appl. No. 09/583,216 Advisory Action mailed Jan. 14, 2004", 2 pgs.

"U.S. Appl. No. 09/583,216 Advisory Action mailed Jul. 7, 2005", 4 pgs.

"U.S. Appl. No. 09/583,216 Final Office Aciton mailed Mar. 11, 2005", 7 pgs.

"U.S. Appl. No. 09/583,216 Final Office Action mailed Oct. 10, 2003", 14 pgs.

"U.S. Appl. No. 09/583,216 Non Final Office Action mailed May 6, 2004", 14 pgs.

"U.S. Appl. No. 09/583,216 Response filed Apr. 15, 2005 to Advisory Action", 8 pgs.

"U.S. Appl. No. 09/583,216 Response filed May 11, 2005 to Final Office Action mailed Mar. 11, 2005", 6 pgs.

"U.S. Appl. No. 09/583,216 Response filed Jul. 14, 2003 to Non Final Office Action mailed Apr. 14, 2003", 10 pgs.

"U.S. Appl. No. 09/583,216 Response filed Nov. 8, 2004 to Non Final Office Action mailed May 6, 2004", 2 pgs.

"U.S. Appl. No. 09/711,578 Final Office Action mailed Jan. 10, 2006", 12 pgs.

"U.S. Appl. No. 09/711,578 Final Office Action mailed Apr. 23, 2004", 7 pgs.

"U.S. Appl. No. 09/711,578 Non Final Office Action mailed Jan. 7, 2005", 7 pgs.

"U.S. Appl. No. 09/711,578 Non Final Office Action mailed Jul. 15, 2005", 8 pgs.

"U.S. Appl. No. 09/711,578 Non Final Office Action mailed Sep. 8, 2003", 7 pgs.

"U.S. Appl. No. 09/711,578 Response filed Feb. 9, 2004 to Non Final Office Action mailed Sep. 8, 2003", 6 pgs.

"U.S. Appl. No. 09/711,578 Response filed May 9, 2005 to Non Final Office Action mailed Jan. 7, 2005", 7 pgs.

"U.S. Appl. No. 09/711,578 Response filed Sep. 23, 2004 to Final Office Action mailed Apr. 23, 2004", 5 pgs.

"U.S. Appl. No. 09/711,578 Response filed Oct. 17, 2005 to Non Final Office Action mailed Jul. 15, 2005", 8 pgs.

"U.S. Appl. No. 11/004,699 Final Office Action mailed Jul. 14, 2006", 8 pgs.

"U.S. Appl. No. 11/004,699 Non Final Office Action mailed Jan. 20, 2006", 10 pgs.

"U.S. Appl. No. 11/004,699 Non Final Office Action mailed Aug. 5, 2005", 6 pgs.

"U.S. Appl. No. 11/004,699 Response filed Apr. 20, 2006 to Non Final Office Action mailed Jan. 20, 2006", 15 pgs.

"U.S. Appl. No. 11/004,699 Response filed Nov. 7, 2005 to Non Final Office Action mailed Aug. 5, 2005", 14 pgs.

U.S. Appl. No. 09/583,216 Final Office Action mailed Oct. 3, 2008, 15 pgs.

U.S. Appl. No. 09/583,216, Response filed Jun. 16, 2008 to Non Final Office Action mailed Feb. 15, 2008, 11 pgs.

U.S. Appl. No. 09/583,216 Non-Final Office Action mailed Feb. 15, 2008, 16 pgs.

U.S. Appl. No. 10/837,244 Response filed May 12, 2008 to Non-Final Office Action mailed Jan. 10, 2008, 18 pgs.

U.S. Appl. No. 10/837,224 Non-Final Office Action mailed Jan. 10, 2008, 7 pgs.

U.S. Appl. No. 09/583,216, Non-Final Office Action mailed Apr. 17, 2009, 13 pgs.

U.S. Appl. No. 11/195,578, Non-Final Office Action mailed May 28, 2009, 33 pgs.

U.S. Appl. No. 10/837,224, Final Office Action mailed Feb. 4, 2009, 12 pgs.

U.S. Appl. No. 09/583,216, Advisory Action mailed Jan. 8, 2009, 3 pgs.

U.S. Appl. No. 09/583,216, Appeal Brief filed Jul. 11, 2005, 20 pgs.

U.S. Appl. No. 09/583,216, Response filed Sep. 17, 2009 to Non Final Office Action mailed Apr. 17, 2009, 9 pgs.

U.S. Appl. No. 09/583,216, Response filed Dec. 3, 2008 to Final Office Action mailed Oct. 3, 2008, 17 pgs.

U.S. Appl. No. 09/711,578, Appeal Brief filed Aug. 3, 2006, 18 pgs.

U.S. Appl. No. 09/711,578, Appeal Brief filed Oct. 27, 2004, 19 pgs.

U.S. Appl. No. 10/837,224 , Notice of Allowance mailed Sep. 4, 2009, 12 Pgs.

U.S. Appl. No. 10/837,224, Advisory Action mailed May 28, 2009, 3 pgs.

U.S. Appl. No. 10/837,224, Response filed Jun. 4, 2009 to Final Office Action mailed Feb. 4, 2009, 13 pgs.

U.S. Appl. No. 10/837,224, Response filed May 6, 2009 to Final Office Action mailed Feb. 4, 2009, 13 pgs.

U.S. Appl. No. 11/004,699, Appeal Brief filed Jan. 17, 2007, 23 pgs.

U.S. Appl. No. 11/004,699, Pre-Appeal Brief Request for Review filed Sep. 14, 2006, 4 pgs.

U.S. Appl. No. 11/004,699, Preliminary Amendment filed Dec. 3, 2004, 14 pgs.

U.S. Appl. No. 11/195,578, Response filed Sep. 28, 2009 to Non Final Office Action mailed 95-28-09, 21 pgs.

* cited by examiner

FIG. 3

| NON-PAYING BIDDER ITEMS TABLE | | | | | |
|---|---|---|---|---|---|
| ITEM NO. | SELLER USER ID | NPB USER ID | REASON FOR FAILED TRANSACTION | NOTICE DATE | NOTICE REASON |
| 302 | 304 | 306 | 308 | 310 | 312 |

| NON-PAYING BIDDERS TABLE | | | | | |
|---|---|---|---|---|---|
| NPB USER ID | ITEM NO. | VALID WARNING COUNT | NPB TICK | REASON FOR NPB TICK | SUSPENDED STATUS |
| 402 | 404 | 406 | 408 | 410 | 412 |

| SELLERS COMPLAINT TABLE | | | | |
|---|---|---|---|---|
| SELLER'S USER ID | NPB USER ID | DATE OF COMPLAINT | REASON FOR COMPLAINT | STATUS OF COMPLAINT |
| 502 | 504 | 506 | 508 | 510 |

| SELLERS FVF REQUEST TABLE | | | | | | |
|---|---|---|---|---|---|---|
| SELLER'S USER ID | NPB USER ID | ITEM NO. | ACTION DESIRED | REASON FOR FVF CREDIT | CREDIT DATE | CREDIT AMOUNT |
| 602 | 604 | 606 | 608 | 610 | 612 | 614 |

| NPB APPEAL TABLE | | | | | |
|---|---|---|---|---|---|
| ITEM NO. | SELLER USER ID | NPB USER ID | REASON FOR FAILED TRANSACTION | REASON FOR APPEAL | APPEAL CODE |
| 702 | 704 | 706 | 708 | 710 | 712 |

FIG. 7

| Quick Summary | Time Frame |
|---|---|
| 1. Contact each other after your auction has ended | Generally within 3 business days is a good idea. |
| 2. Complete a Non-Paying Bidder Alert Form. | After 7 days but not past 45 days of your auction's close. |
| 3. Try to work things out. | After you file a Non-Paying Bidder Alert, try to work things out with your bidder in the next 10 days. |
| 4. Request your Final Value Fee credit. | If you still haven't resolved things after 10 days of filing an Alert, complete the Final Value Fee Credit Request Form within 60 days of your auction's close. |

Special note about Dutch Auctions: They work the same as other auctions with one exception: You may file a Non-Paying Bidder Alert Form only once per auction for as many bidders as necessary. That is, you cannot go back and file additional Alerts if you have more non-paying bidders from the same auction.

Special note to bidders: If you are a bidder and believe you received an unfair warning, you may appeal it by using eBay's Non-Paying Bidder Appeal Form. Warnings will remain on your record until they are successfully appealed.

Click here to visit our Non-Paying Bidder Frequently Asked Questions page.

Announcements | Register | eBay Store | SafeHarbor (Rules & Safety) | Feedback Forum | About eBay
Home | My eBay | SITE MAP
Browse | Sell | Services | Search | Help | |Community
Basics | Buyer Guide | Seller Guide | My Info | Billing | Rules & Safety

| home | my page | site map | sign in |

| Browse | Sell | Services | Search | Help | Community |

| overview | registration | buying & selling | my page | about me | feedback forum | safe harbor |

▷ Check out Modern and Contemporary Art on eBay Great Collections.   [Search] tips
☐ Search titles and descriptions

Non-Paying Bidder Alert Form

The Non-Paying Bidder Alert Form is intended to be a workout period to help buyers and selers resolve their trading problems. After you file a Non-Paying Bidder Alert, eBay will send an email to both you and the high bidder, advising the high bidder that you have notified eBay that the bidder is a potential non-paying bidder and encouraging the high bidder to complete the transaction. You must file a Non-Paying Bidder Alert Form before you may request a Final Value Fee credit. If you have any questions about our Non-Paying Bidder Policy, click here.

Please use care when filing a Non-Paying Bidder Alert--this Form should be used only if the high bidder is unresponsive. Using this Form as a tool to intimidate or coerce your buyers into completing the transaction may be cause for suspension.

To file a Non-Paying Bidder Alert against another eBay user:

- You must have a registered eBay User ID and password.
- You must be the seller of that item.
- At least 7 days and no more than 45 days have passed since the auction ended.
- The auction must have received at least one winning bid (for reserve auctions, this means at least one bid met or exceeded the reserve price.)
- NOTE: If your auction was a Dutch auction, you may file a Non-Paying Bidder Alert against as many bidders as you deem necessary, but you are entitled to file a Non-Paying Bidder Alert Form only once for each such auction. Thus, please wait until you know the staus of all winning bidders before you file a Non-Paying Bidder Alert Form.

If you've satisfied all these conditions and want to file a Non-Paying Bidder Alert, please fill out the following form.

Your User ID: [                    ]   1004
You can also use your email address.
Your Password: [                    ]

Forgot your password?

Save time by signing in. (You may also sign in securely).   1006

| Item Number | [                                        ] |

Click [Submit] to continue.

Announcements | Register | eBay Store | SafeHarbor (Rules & Safety) | Feedback Forum | About eBay

FIG. 10A

1010 home | my page | site map | sign in

Browse | Sell | Services | Search | Help | Community

▷ QA Staging Test Environment. Schema is e199_staging_main

[ Search ] tips
☐ Search titles and descriptions

Non-Paying Bidder Alert Form

| "npb mockups" |
|---|
| Item #1021721 |

Date Auction Ended: *07/25/00*
Final Bid Price: *$2.25*

Please complete all fields that provided below.       1010

| Reason for Non-Paying Bidder Alert | -- |
| --- | --- |
| | Select reason from choices provided. |
| Bidders e-mail address | testuser3@superslice.com |

Please make sure that you have provided accurate information. eBay may use information provided here to identify bidders who are not complying with eBay rules.

Filing false Non-Payable Bidder Alerts is a form of harassment. Sellers found to be guilty of this offense will be suspended.

Click [ Submit ] to enter your Non-Paying Bidder Alert.

default

FIG. 10B

| | home | my page | site map | sign in |

| Browse | Sell | Services | Search | Help | Community |

| overview | registration | buying & selling | my page | about me | feedback forum | safe harbor |

▷ Check out Modern and Contemporary Art on eBay Great Collections.   [         ] [Search] tips
☐ Search titles and descriptions

Final Value Fee Credit Request Form

To request credit for Final Value Fees from a listing:

- You must have filed a Non-Paying Bidder Alert Form
- At least 10 days passed since you filed the Non-Paying Bidder Alert Form.
- No more than 60 days passed since the auction ended.
- Insertion fees and fees for listing options are non-refundable.

Note: Once you submit this Final Value Fee Credit Request Form, the high bidder will receive an email from eBay and may receive a Non-Paying Bidder Warning, which may result in the suspension of that user's account.

If you've satisfied all these conditions and want to file a Non-Paying Bidder Alert, please fill out the following form.

1104

Your User ID: [                    ]
You can also use your email address.
Your Password: [                    ]
Forgot your password?

1106

Save time by signing in. (You may also sign in securely).

| Item Number | [                                    ] |

Click [Submit] to continue.

Announcements | Register | eBay Store | SafeHarbor (Rules & Safety) | Feedback Forum | About eBay

FIG. 11A

1108 home | my page | site map | sign in

Browse | Sell | Services | Search | Help | Community

▷ QA Staging Test Environment. Schema is e199_staging_main

[Search] tips
☐ Search titles and descriptions

Final Value Fee Credit Request

| "npb mockups" |
|---|
| Item #1021721 |

Date Auction Ended: *07/25/00*
Final Bid Price: *$2.25*

Please complete all fields that provided below.    1110

| Did you receive any money from the bidder? | ⦿ No  ○ Yes    If Yes, how much? [    ]  (numerals and decimal point '.' only.) |
|---|---|
| Reason for refund | -- <br> Select reason from choices provided. |
| Bidders e-mail address | testuser3@superslice.com |

Please make sure that you have provided accurate information. eBay may use information provided here to identify bidders who are not complying with eBay rules.

Filing false Non-Payable Bidder Alerts is a form of harassment. Sellers found to be guilty of this offense will be suspended.

Click [ Submit ] to enter your final value fee credit request.

FIG. 11B home | my page | site map | sign in

Browse | Sell | Services | Search | Help | Community

▷ QA Staging Test Environment. Schema is e199_staging_main    [Search] tips
☐ Search titles and descriptions

1120

Final Value Fee Credit Request

| "npb mockups" |
| Item #1021722 |

Date Auction Ended: *Jul-25-00*
Final Bid Price: *$2.00*

Please complete all fields that provided below to apply for credit.

This form allows you to request final value fee for this item. Click "Continue" button below to submit your request.

Bidder #1 Only provide information if this bidder backed out    1122

| | |
|---|---|
| Did you receive any money from the bidder? | ⦿ No  ○ Yes   If Yes, how much? [    ] (numerals and decimal point '.' only.) |
| Reason for refund | [-- ▼] Select reason from choices provided. |
| Bidders e-mail address | [-- ▼] Select a bidder from the list provided. |

Bidder #2 Only provide information if this bidder backed out    1124

| | |
|---|---|
| Did you receive any money from the bidder? | ⦿ No  ○ Yes   If Yes, how much? [    ] (numerals and decimal point '.' only.) |
| Reason for refund | [-- ▼] Select reason from choices provided. |
| Bidders e-mail address | [-- ▼] Select a bidder from the list provided. |

Please make sure that you have provided accurate information. eBay may use information provided here to identify bidders who are not complying with eBay rules.

Filing false Non-Payable Bidder Alerts is a form of harassment. Sellers found to be guilty of this offense will be suspended.

Click [Continue] to enter your final value fee credit request.

FIG. 11C

1202 home | my page | site map | sign in

Browse | Sell | Services | Search | Help | Community basics | buyer guide | seller guide | my info | billing | rules & safety ▷ Check out Modern and Contemporary Art on eBay Great Collections.

[Search] tips

☐ Search titles and descriptions

Non-Paying Bidder Appeal

To appeal a warning which you feel you have received in error, please provide the following information to eBay, using the message field on this form:

- The reason for your appeal
- Any supporting information

Your User ID: [        ]
You can also use your email address.    1204

Your Password: [        ]
Forgot your password?

Save time by signing in. (You may also sign in securely).

| Item Number | [        ] 1206 |
| Message | [        ] |

1208

[Send Inquiry] [Clear all data]

FIG. 12

1302 home | my page | site map | sign in

| Browse | Sell | Services | Search | Help | Community |

▷ QA Staging Test Environment. Schema is e199_staging_main

[ Search ] tips
☐ Search titles and descriptions

NPB Appeal Confirmation

Please complete all fields provided below to update users account

1304

| Item Number | 1021722 |
|---|---|
| Sellers UserID | test2@superslide.com |
| Bidders UserID | test1@superslide.com |
| Reason for NPB Appeal | -- ▼<br>Select reason from choices provided. |
| NPB Action Request | -- ▼<br>Select reason from choices provided. |

Press the confirm button to complete the transaction and update test1@superslice.com's deadbeat score.

[ confirm ]
defualt

FIG. 13 home | my page | site map | sign in

Browse | Sell | Services | Search | Help | Community

▷ QA Staging Test Environment. Schema is e199_staging_main

[Search] tips
☐ Search titles and descriptions

Transaction Backout Profile for test1@superslice.com (0)

[View user's eNotes]

Credit Requests: 2
Unique NPB Score: 1
Total NPB Score: 1
Warnings Issued: 0
User Status: Confirmed Here is the list of items that test1@superslice.com (0) has received full or partial credit for:

| Code | Item | Start | End | Price | Title | Bidder |
|---|---|---|---|---|---|---|
| 2 | 1021763 | Aug-04-00 | Jul-25-00 12:46:35 | 2.00 | npb mockups2 | test2@superslice.com (101) ★ |
| 2 | 1021721 | Aug-04-00 | Jul-25-00 11:24:57 | 2.25 | npb mockups | testuser3 (0) |

Here is the list of transactions that test1@superslice.com (0) has backed out of:

| Code | Item | Start | End | Price | Title | Bidder |
|---|---|---|---|---|---|---|
| 3 [Remove] | 1021722 | Aug-04-00 | Jul-25-00 11:25:06 | 2.25 | npb mockups-dutch | test2@superslice.com (101) ★ |

Announcements | Register | eBay Store | SafeHarbor (Rules & Safety) | Feedback Forum | About eBay

FIG. 14

METHOD AND SYSTEM FOR DEALING WITH NON-PAYING BIDDERS RELATED TO NETWORK-BASED TRANSACTIONS

FIELD OF THE INVENTION

The present invention relates generally to the field of e-commerce. More particularly, the present invention relates to a method and system for dealing with non-paying bidders related to network-based transactions.

BACKGROUND OF THE INVENTION

A common type of network-based transaction is purchasing goods or services via a network-based transaction facility, e.g., a website on the Internet. One type of network-based transaction is an online-auction transaction. In an online-auction transaction, a seller offers an item for sale via an auction website in which a number of bidders access the website and bid for the item. A transaction is completed after the winning bidder pays for the item and the seller delivers the item to the winning bidder.

A typical problem associated with such a transaction is a winning bidder failing to follow through with the transaction. For example, the winning bidder may fail to pay for the auctioned item or provide a fraudulent check to purchase the item. In such a case, the bidder is referred to as a "non-paying bidder." As a result of a failed transaction, the seller may request a refund for a fee that may have been charged by the network-based transaction facility to facilitate the transaction. Another problem that may occur is a seller falsely claiming that a transaction did not go through to obtain a refund when in fact a valid sale occurred.

Thus, there is a need to minimize the number of non-paying bidders and to minimize seller abuse in falsely claiming refunds. Furthermore, there is a need to track non-paying bidders and to minimize network-based transaction facility resources in tracking non-paying bidders.

SUMMARY OF THE INVENTION

A method and system for dealing with non-paying bidders related to network-based transactions are disclosed. for one embodiment, a submission of a complaint is submitted to a network-based facility. The complaint is related to a party in a failed transaction. A resolution of the complaint is facilitated. A record associated with the party is updated if the complaint is not resolved. The record indicates a count of failed transactions related to the party. A refund request can also be facilitated if the complaint is not resolved.

BRIEF DESCRIPTION OF THE DRAWINGS

The present invention is illustrated by way of example and not intended to be limited by the figures of the accompanying drawings in which like references indicate similar elements and in which:

FIG. 3 is a diagrammatic representation of an exemplary non-paying bidder items table of the database illustrated in FIG. 2;

FIG. 4 is a diagrammatic representation of an exemplary non-paying bidders table of the database illustrated in FIG. 2;

FIG. 5 is a diagrammatic representation of an exemplary sellers complaint table of the database illustrated in FIG. 2;

FIG. 6 is a diagrammatic representation of an exemplary sellers final value fee request table of the database illustrated in FIG. 2;

FIG. 7 is a diagrammatic representation of an exemplary non-paying bidder appeal table of the database illustrated in FIG. 2;

FIGS. 9A and 9B illustrate exemplary interfaces providing information about a non-paying bidder program;

FIGS. 10A and 10B illustrate exemplary interfaces for entering a non-paying bidder alert or complaint form;

FIGS. 11A through 11C illustrate exemplary interfaces for entering a final value fee credit request form;

FIG. 12 illustrates an exemplary interface for entering a non-paying bidder appeal;

FIG. 13 illustrates an exemplary interface for providing a non-paying bidder appeal confirmation;

FIG. 14 illustrates an exemplary interface for providing a transaction backout profile.

DETAILED DESCRIPTION

A method and system for dealing with non-paying bidders related to network-based transactions are described. For one embodiment, a submission of a complaint is submitted to a network-based facility. The complaint is related to a party in a failed a transaction. A resolution of the complaint is facilitated. A record associated with the party is updated if the complaint is not resolved. The record indicates a count of failed transactions related to the party. A refund request can also be facilitated if the complaint is not resolved.

The method and system described herein can reduce abuse by users filing false refund requests for failed transactions by allowing a user who fails to follow through in a transaction an opportunity to resolve or complete the transaction. Furthermore, the number of users failing to complete a transaction can be reduced by maintaining a record indicating a count of failed transactions related to the user. If the count exceeds a threshold, the user is suspended from participating in transactions on the network-based facility.

In the following embodiments, for purposes of explanation, numerous specific details are set forth in order to provide a thorough understanding of the present invention. It will be evident, however, to one skilled in the art that the present invention may be practiced without these specific details.

Terminology

In the following embodiments, the term "transaction" or "transactions" refers to any communications between two or more entities and is to be construed to include, but limited to, commercial transactions including sale and purchase transactions, online-auction transactions and other like transactions.

Transaction Facility

Figure 1:
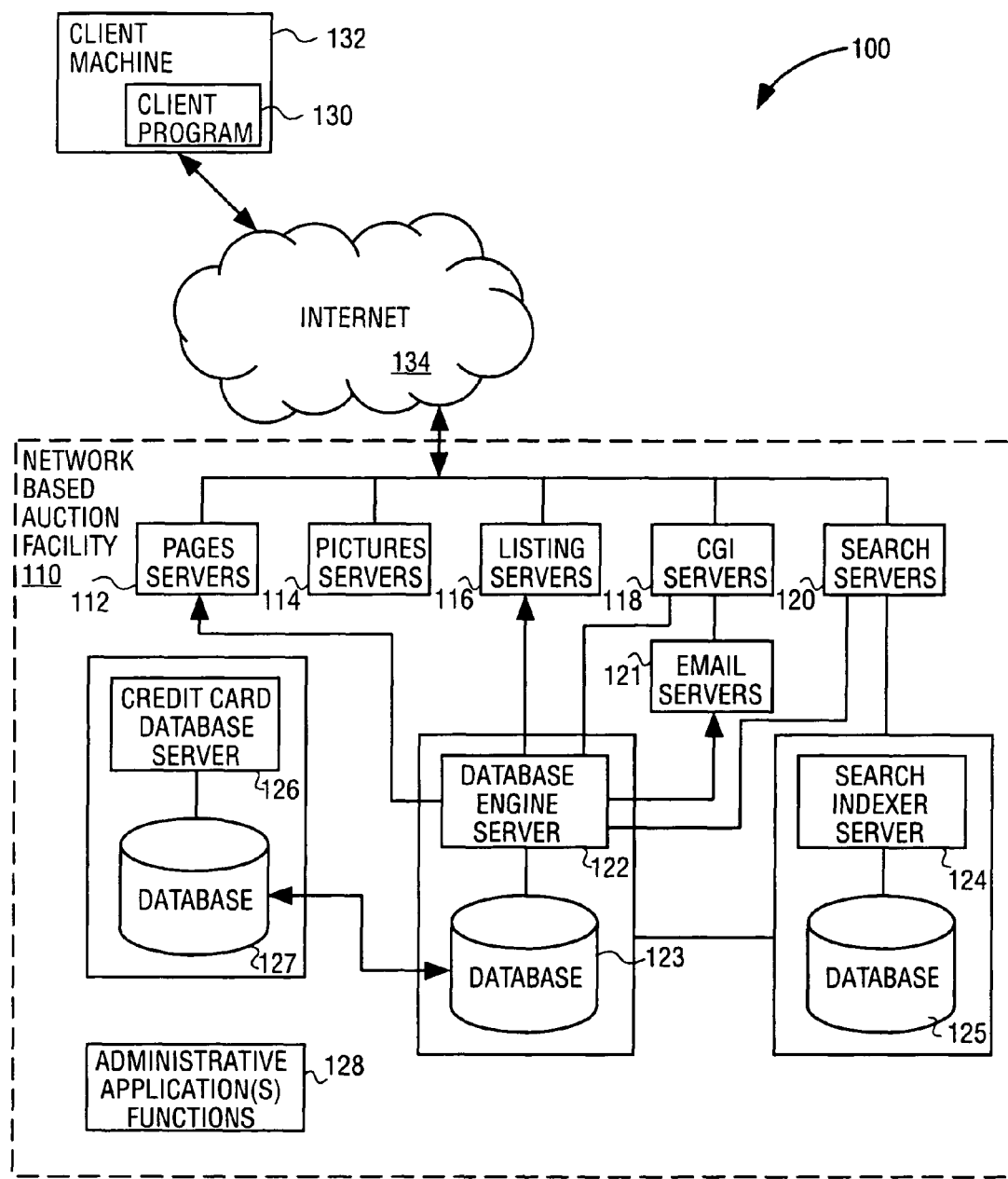
FIG. 1 is a block diagram illustrating an exemplary network-based transaction facility in the form of an Internet-based auction facility.

FIG. 1 is a block diagram illustration of an exemplary network-based transaction facility 100 in the form of an "Internet" network-based auction facility 110. While an exemplary embodiment of the present invention is described within the context of an auction facility, it will be appreciated by those skilled in the art that the invention will find application in many different types of computer-based, network-based, or e-commerce based facilities.

The auction facility 110 includes one or more of a number of types of front-end servers, namely pages servers 112 that deliver web pages (e.g., markup language documents), pictures servers 114 that dynamically deliver images to be displayed within Web pages, listing servers 116, CGI servers 118 that provide an intelligent interface to the back-end of facility 110, and search servers 120 that handle search requests to the facility 110. Email servers 121 provide, inter alia, automated email communications to users of the facility 110. Auction facility 110 also includes administrative application(s) functions 128 for providing functions for applications running auction facility 110.

The back-end servers include a database engine server 122, a search index server 124 and a credit card data server 126, each of which maintains and facilitates access to respective databases 123, 125, 127, respectively.

The Internet-based auction facility 110 may be accessed by a client program 130, such as a browser (e.g., the Internet Explorer® distributed by Microsoft Corp. of Redmond, Wash.) that executes on a client machine 132 and accesses the facility 110 via a network such as, for example, the Internet 134. Other examples of networks that a client may utilize to access the auction facility 110 include a wide area network (WAN), a local area network (LAN), a wireless network (e.g., a cellular network), or the Plain Old Telephone Service (POTS) network.

Database Structure

Figure 2:
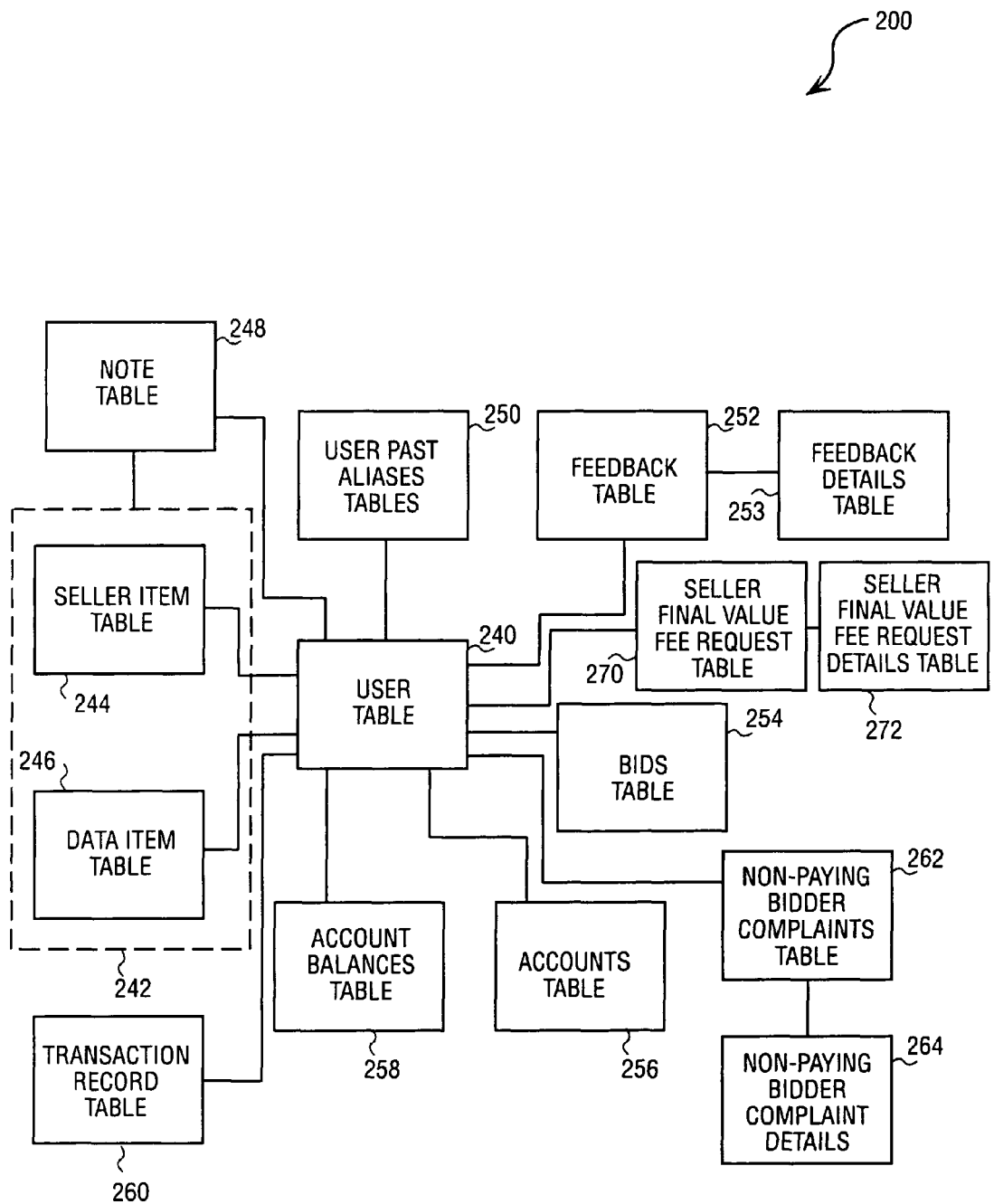
FIG. 2 is a database diagram illustrating an exemplary database for the transaction facility.

FIG. 2 is a database diagram illustration of an exemplary database 200, maintained by and accessed via the database engine server 122, which at least partially implements and supports the network-based auction facility 110. Database 123 may, in one embodiment, be implemented as a relational database, and includes a number of tables having entries, or records, that are linked by indices and keys. In an alternative embodiment, database 123 may be implemented as a collection of objects in an object-oriented database.

Central to the database 123 is a user table 240, which contains a record for each user of the auction facility 110. A user may operate as a seller, buyer, or both, within the auction facility 110. Database 123 also includes item tables 242 that may be linked to the user table 240. Specifically, tables 242 include a seller item table 244 and data items table 246. A user record in user table 240 may be linked to multiple items that are being, or have been, auctioned via auction facility 110. A link indicates whether the user is a seller or a bidder (or buyer) with respect to items for which records exist within the item tables 242. Database 123 also includes a note table 248 populated with note records that may be linked to one or more item records within the item tables 242 and/or to one or more user records with the user table 240. Each note record within the note table 248 may include, inter alia, a comment, description, history of other information pertaining to an item being auction via auction facility 100, or to a user of auction facility 110.

A number of other tables are also shown to be linked to the user table 240, namely a user past aliases table 250, a feedback table 252, a feedback details table 253, a transaction record table 260, account balances table 258, accounts table 256, bids table 254, seller final value fee request table 270, seller final value fee request details table 272, non-paying bidder complaints table 262, and non-paying bidder complaint details table 264.

Non-Paying Bidder Complaint/Final Value Fee Request Record Tables

FIGS. 3-8 are diagrammatic representations of exemplary embodiments of transaction record tables that are populated with records or entries for non-paying bidder complaints and final value fee requests relating to failed transactions (e.g., failed Internet based auction transactions) that have been facilitated by auction facility 110. Such transaction record tables may be stored in non-paying bidder complaints table 262, non-paying bidder complaint details table 264, seller final value fee request table 270, seller final value fee request details 272.

FIG. 3 is a diagrammatic representation of an exemplary non-paying bidder items table 300 of the database illustrated in FIG. 2. Referring to FIG. 3, non-paying bidder (NPB) items table 300 includes an item no. column 302, seller user ID column 304, NPB user ID column 306, reason for failed transaction column 308, notice date column 310, and notice reason column 312.

Item no. column 302 stores item identifiers of items involved in failed transactions. Seller user ID column 304 stores user IDs of sellers who auctioned an item in item no. column 302. NPB user ID column 306 stores user IDs of buyers who did not follow through on a transaction related to the items identified in item no. column 302. Reasons for failed transaction column 308 stores reasons why the transaction failed that may be given by a seller. For example, reasons may include a buyer failing to purchase an item or providing a fraudulent check to pay for the item.

Notice date column 310 stores the date a notice was sent to the respective buyer identified in the NPB user ID column 306 that he/she has not completed the transaction for the item identified in the respective item no. column 302. Notice reason column 312 stores the reasons why the notice was sent. For example, the notice can be sent because a seller filed a final value fee refund request or the seller filed a NPB alert against the buyer.

FIG. 4 is a diagrammatic representation of an exemplary non-paying bidders table 400 of the database illustrated in FIG. 2. Referring to FIG. 4, non-paying bidders table 400 includes a NPB user ID column 402, item no. column 404, valid warning count 406, NPB tick column 408, reason for NPB tick column 410, and suspended status column 412.

NPB user ID column 402 stores the user IDs of buyers in which a complaint has been filed. The buyers listed in NPB user ID column 402 are buyers involved in failed transactions. Item no. column 404 stores identifiers of items involved in transactions in which the buyer listed in NPB user ID column 402 was the winning bidder and failed to complete the transaction for the item.

Valid warning count column 406 stores a count value on the number of times the NPB received a warning for being a "non-paying bidder" or for failing to complete a transaction. NPB tick column 408 stores the number of times the NPB has been involved in a failed transaction in which the NPB was at fault. Reason for NPB tick column 410 stores the reasons for the NPB tick. Suspended status column 412 stores the status of the NPB to participate on the network-facility. For example, after a certain number of NPB ticks, the NPB can be suspended from participating in an on-line auction on the network-based facility.

FIG. 5 is a diagrammatic representation of an exemplary sellers complaint table 500 of the database illustrated in FIG. 2. Referring to FIG. 5, sellers complaint table 500 includes a seller user ID column 502, NPB user ID column 504, date of complaint column 506, reason for complaint column 508, and status of complaint column 510.

Seller user ID column 502 stores the user IDs of sellers filing NPB complaints. NPB user ID column 504 stores user IDs of buyers in which a NPB complaint has been filed against. Date of complaint column 506 stores the date in which the NPB complaint was filed. Reason for complaint column 508 stores the reasons why the seller filed the NPB complaint. Status of complaint column 510 stores the status of the complaint. For example, the status can indicate that the complaint has been resolved or if it is pending.

FIG. 6 is a diagrammatic representation of an exemplary sellers final value fee (FVF) request table 600 of the database illustrated in FIG. 2. Referring to FIG. 6, sellers FVF request table 600 includes sellers user ID column 602, NPB user ID column 604, item no. column 606, action desired column 608, reason for FVF credit column 610, credit date column 612, and credit amount column 614.

Sellers user ID column 602 stores the user IDs of sellers filing a FVF refund request. NPB user ID column 604 stores the user IDs of the NPB related to the FVF refund request by the seller. Item no. column 606 stores an identifier of the item related to the FVF refund request. Action desired column 608 stores the requests of the seller. For the seller may request a refund or a credit for future transactions.

Reason for FVF credit column 610 stores the reason for the credit. For one embodiment, the following reasons are not valid reasons for filing a FVF credit, which are: (1) the bidder paid, returned it and seller issued a refund; (2) Seller and Buyer mutually agreed not to complete the transaction; or (3) sale price to high bidder was lower than final high bid. Credit date column 612 stores the date in which a refund or a credit for future transactions was given. Credit amount column 614 stores the amount of the credit or refund given.

FIG. 7 is a diagrammatic representation of an exemplary non-paying bidder appeal table 700 of the database illustrated in FIG. 2. Referring to FIG. 7, NPB table 700 includes an item no. column 702, seller user ID column 704, NPB user ID column 706, reason for failed transaction column 708, reason for appeal column 710, and appeal code column 712.

Item no. column 702 stores item identifiers related to failed transactions. The failed transaction has caused an NPB to have a "tick" or count against him in which the NPB is considered at fault. Seller user ID column 304 stores user IDs of sellers who auctioned an item in item no. column 302 and filed a NPB complaint or alert against the NPB. NPB user ID column 306 stores user IDs of buyers who did not follow through on a transaction related to the items identified in item no. column 302.

Reasons for failed transaction column 308 stores reasons why the transaction failed. For example, reasons may include a buyer failing to pay for an item or providing a fraudulent check to pay for the item. Reason for appeal column 710 stores reasons why the NPB is appealing a NPB tick. A valid reason for appeal can be that the NPB did pay for the item and the seller is providing a false complaint to obtain a FVF refund or credit. The appeal code column 712 stores codes related to the appeal. For example, the codes can indicate if the appeal is granted and the NPB tick is taken away or if the appeal is denied.

The above record tables are exemplary and additional column entries or tables can be used by network facility 110 to provide services such that users of network facility 110 may file complaints for a bidder or buyer ("non-paying bidder") who has failed to follow through on a transaction (e.g., an online auction sale). Furthermore, the network facility 100 can also provide a final value fee (FVF) refund request or credit service for sellers involved in a failed transaction. The network facility 110 can also keep track of NPB and suspend the NPB if involved in more than a certain number of failed transactions.

In the following operations, a seller is able to file a complaint against a bidder ("non-paying bidder") who has failed to follow through on a transaction (e.g., an auction sale) after a certain period of time from the end of the sale. A notification is provided to the non-paying bidder ("NPB") so that the seller and a bidder can communicate with each other to resolve the complaint or complete the transaction. If the parties cannot resolve the complaint after a certain period of time, the seller is allowed to file a FVF refund request for the FVF that the seller may have paid to facilitate the sale on the network-based facility. A NPB count or "tick" will be maintained for every failed transaction in which the NPB is involved in.

Filing a Non-Paying Bidder Alert or Complaint

FIGS. 8A through 8D are flow charts illustrating an exemplary operation 800 for a network-based facility to handle non-paying bidders and to handle final value fee refund requests. The following exemplary operation 800 can utilize the record tables of FIGS. 3-7 and other information contained in the database as shown in FIG. 2.

Figure 8A:
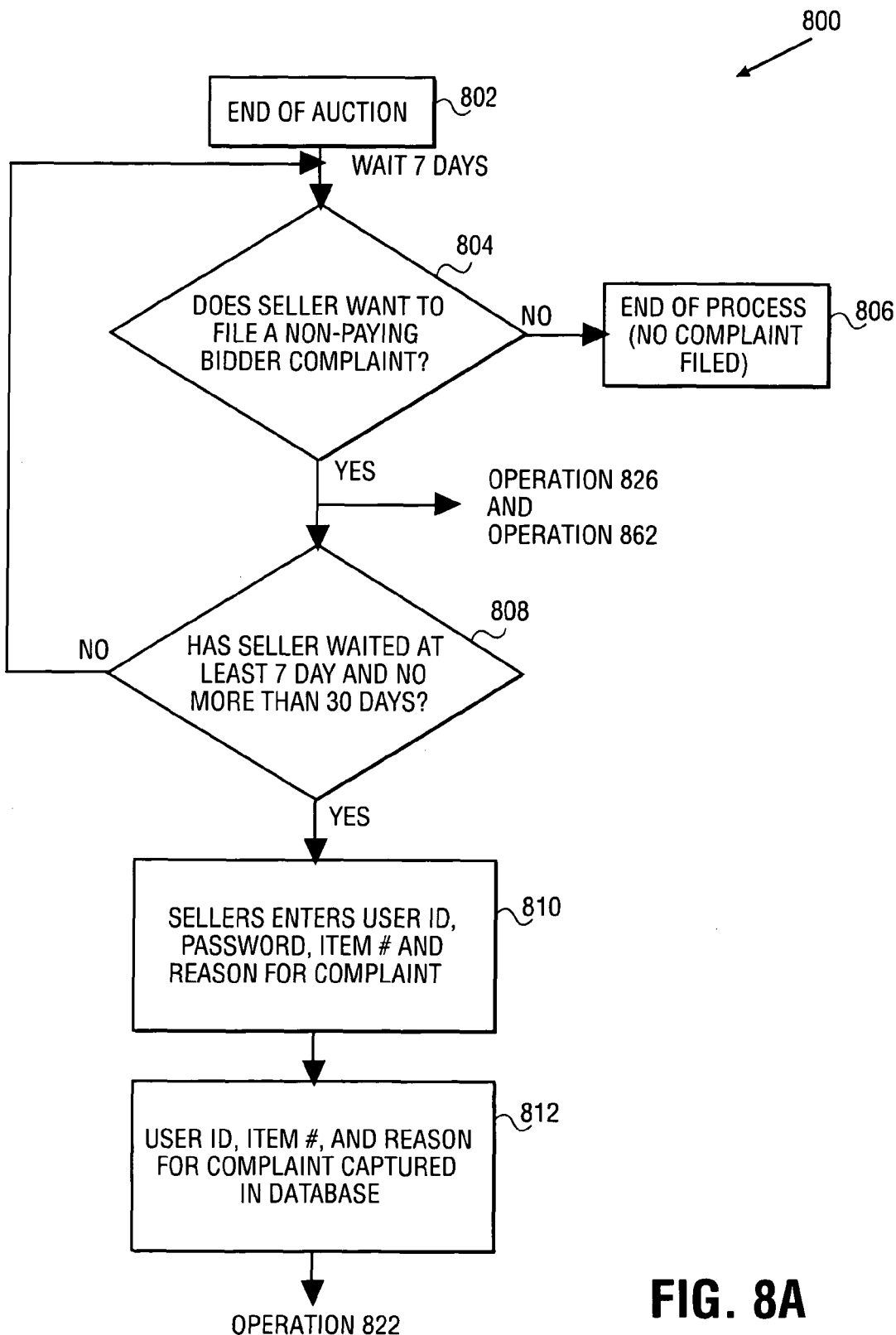
FIGS. 8A through 8D are flow charts illustrating an exemplary operation for a network-based facility to handle non-paying bidders and to handle final value fee refund requests.
Figure 9A:

Referring to FIG. 8A, for purposes of explanation, operation 800 begins at operation 802 after an end of an auction. At operation 804, a seller who was involved in a failed transaction with a buyer can file a non-paying bidder (NPB) complaint or alert. For one embodiment, the seller, however, must wait at least 7 calendar days before a complaint can be filed. To learn about the NPB program, the seller can access an interface such as interface 902 shown in FIG. 9A to learn more about the NPB program.

At operation 806, if the seller does not wish to file a complaint or alert, operation 800 ends. If the seller does wish to file a complaint, operation 800 can continue to operation 826, 862, and 808. At operation 808, a determination is made if the seller has waited at least 7 days and no more than 30 days. The waiting period is to give the bidder an opportunity to complete the transaction before the seller can file a complaint or request a final value fee refund or request.

Figure 10C:
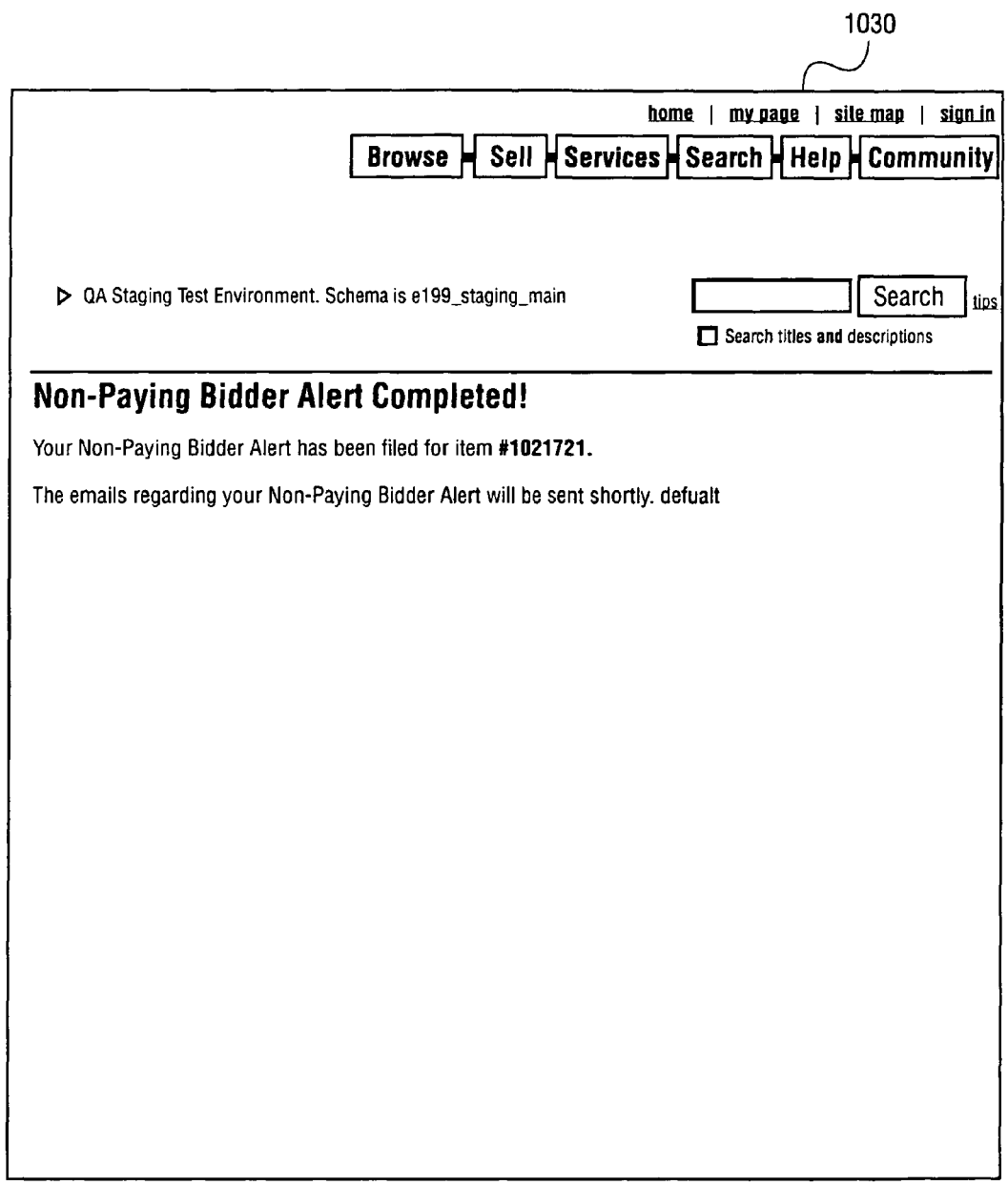
FIG. 10C illustrates an exemplary interface indicating that a non-paying bidder alert or complaint form has been filed.

If the seller has not waited at least 7 days and no more than 30 days, operation 800 returns to operation 804. If after the 7 day waiting period, but before 30 days after end of auction, at operation 810, the seller may file a NPB complaint. For example, interfaces such as interfaces 1002 and 1010, as shown in FIGS. 10A and 10B, can be presented to the seller. The seller can then enter information such as User ID, Password, and Item Number as shown in windows 1004 and 1006. The seller can also enter reasons for the complaint as shown in window 1012.

At operation 812, the information entered by the seller is captured or stored in a database such as that shown in FIG. 2. An interface such as interface 1030 shown in FIG. 10C can be presented to the seller indicating that NPB complaint or alert has been completed. Operation 800 then continues to operation 822 in FIG. 8B.

Figure 8B:
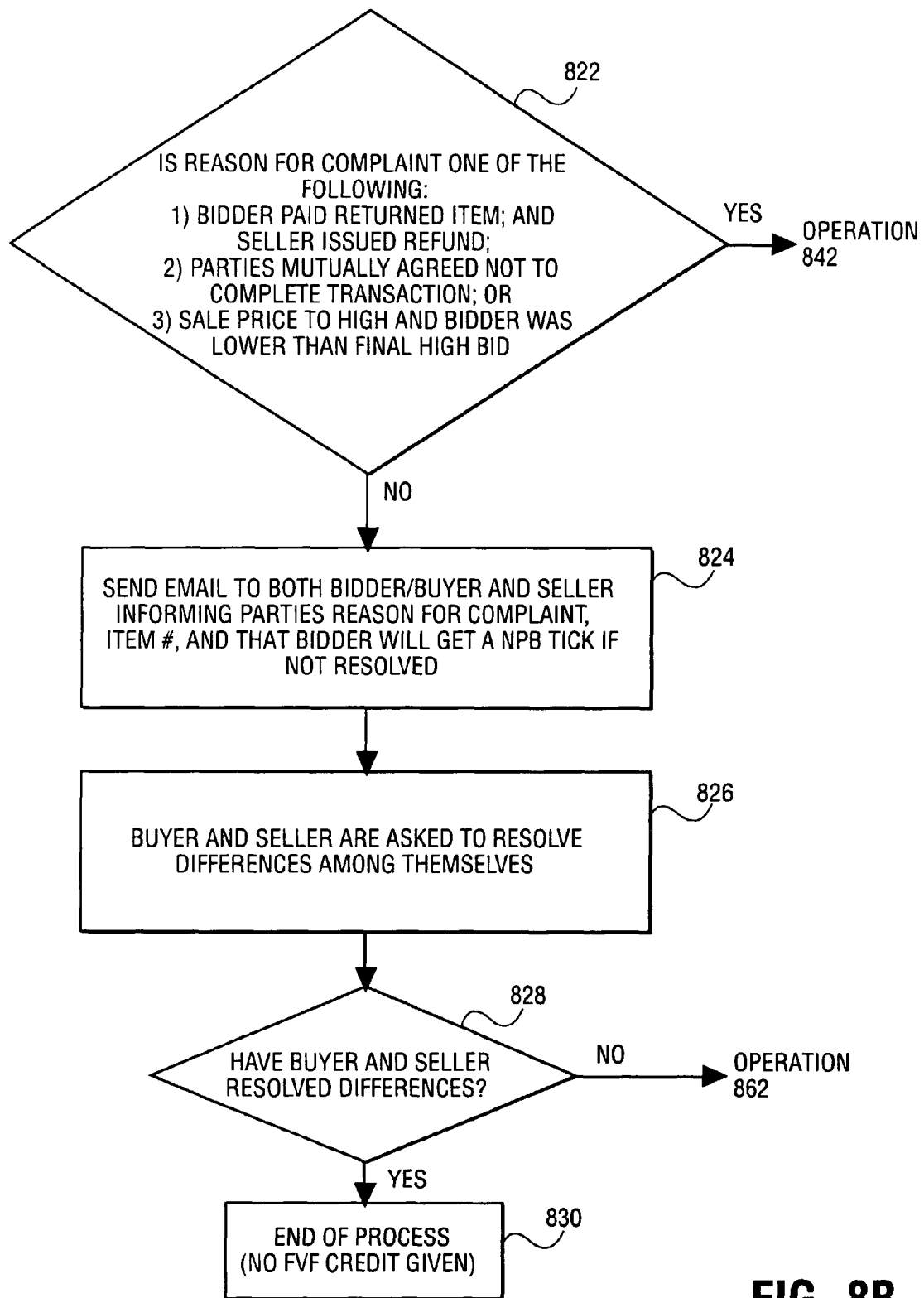

Referring to FIG. 8B, at operation 822 a determination is made if the reasons for the complaint are one of the following:
1) bidder paid returned item and seller issued a refund;
2) the parties mutually agreed not to complete the transaction; or
3) sale price to high and bidder bid price was lower than final high bid.

Figure 8C:
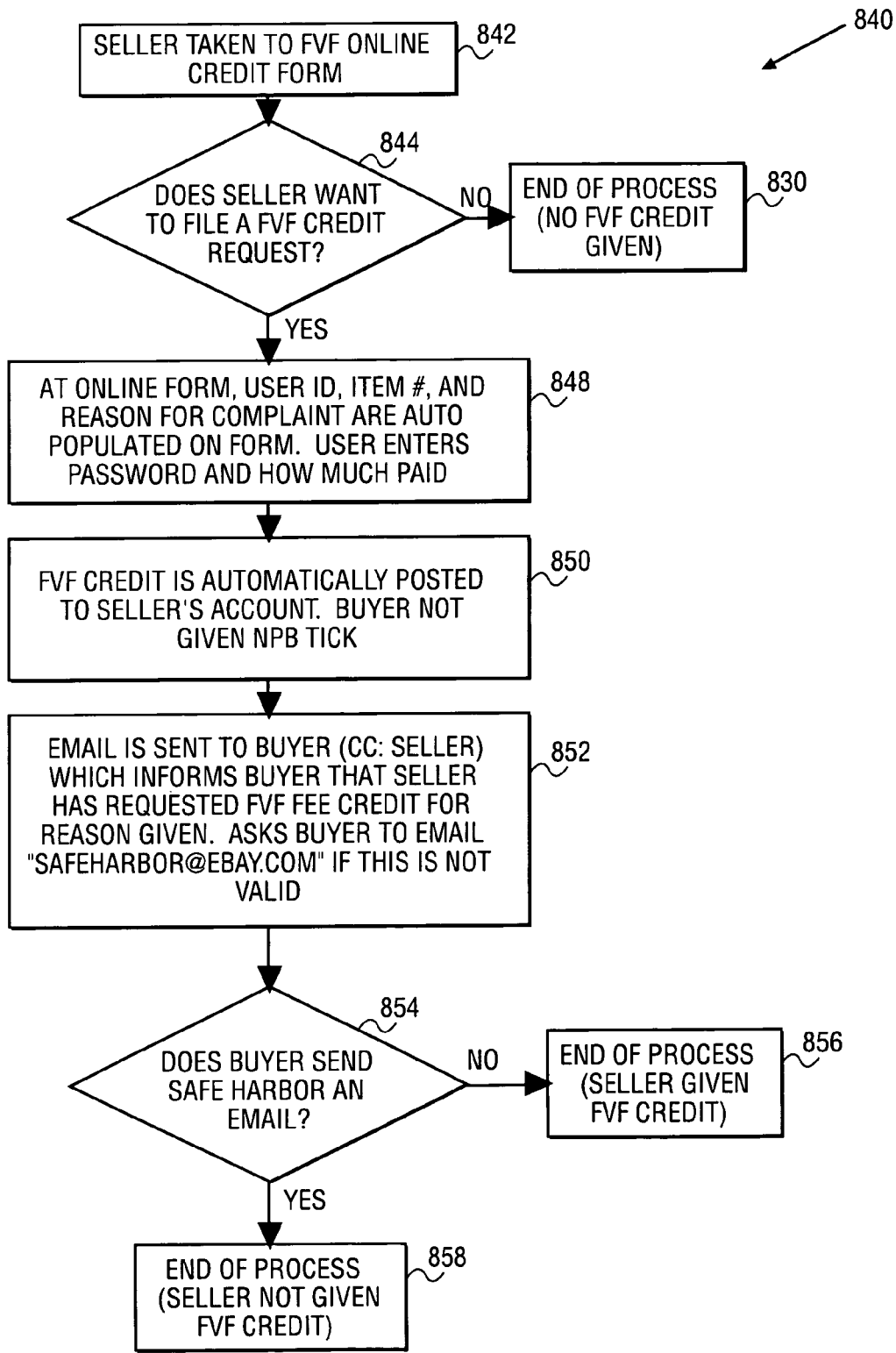

If the reasons for the complaint are one of the above reasons, operation 800 continues at operation 842 in FIG. 8C. If not, operation 800 continues to operation 824.

At operation 824, an email is sent to both bidder/buyer and seller informing the parties reason for complaint, item number, and that bidder will get a NPB tick if the complaint is not resolved. The buyer is informed that the seller has filed a complaint. If the buyer believes the seller has made false statements, the buyer can inform the network facility. For example, the buyer can send an email to a "safeharbor" within the network facility.

At operation 826, the buyer and seller are asked to resolve differences among themselves. This notification can be a separate email or contained in the email of operation 824. For one implementation, the email to the NPB can encourage the buyer to leave negative feedback for the seller if the buyer responded during the mediation period and the seller did not respond and is now filing a FVF credit request.

At operation 828, a determination is made if the buyer and seller have resolved their differences, i.e., completed the transaction. If the parties have not resolved their differences, operation 800 continues to operation 862 in FIG. 8D. If the parties do resolve their differences, at operation 830 the process ends. The seller cannot file a FVF refund request because the transaction has been completed and no FVF credit is given. Furthermore, the buyer is not given a NPB tick.

Filing a Final Value Fee Refund Request

Referring to FIG. 8C, if the reason for filing the complaint is one of the reasons stated in operation 822 of FIG. 8B, operation 800 continues to operation 842. At operation 842, the seller is taken to an FVF online credit form such as that shown in interfaces 1102, 1108, or 1120 of FIGS. 11A through 11C. For one implementation, the seller is not allowed to file a FVF credit until at least 10 days have passed since the seller filed the NPB complaint. Furthermore, the FVF credit request cannot be made more than 60 days after the end of auction At this point, the seller can request a FVF refund or credit because transaction that was not completed for valid reasons. At operation 844, a determination is made of the seller wants to file a FVF refund or credit request. At operation 846, if the seller does not wish to file a FVF credit request, the seller can leave interfaces 1102, 1108, or 1120 and the process ends. If, however, the seller does wish to file a FVF credit request, operation 800 continues to operation 848.

At operation 848, the seller's user ID, item number, and reasons for complaint can be auto-populated on the online form. Alternatively, the aforementioned information can be entered by the seller as shown in windows 1104 and 1106 in FIG. 11A. The seller can then enter his/her password and how much was paid for the item in windows 1104 and 1110, 1122, and 1124 as shown in FIGS. 11A through 11C.

At operation 850, the FVF credit is automatically posted to seller's account. Buyer is not given a NPB tick because there was a valid reason on why the transaction was not completed.

At operation 852, an email is sent to the buyer (cc. Seller) that informs the buyer that seller has request FVF credit for reasons given. Ask buyer to email the "safeharbor" if this is not valid. For example, if the buyer did complete the transaction, then the seller is fraudulently request a FVF refund request/credit.

At operation 854, a determination is made if the buyer has sent an email to the "safeharbor." If no email is sent, at operation 856, the process ends. If the buyer does send an email to the safeharbor, at operation 858, the seller is not given a FVF credit and the process ends. Here, a further determination can be made by the network facility to inquire about the validity of the buyer's and seller's statements.

Filing a Non-Paying Bidder Appeal

Figure 8D:
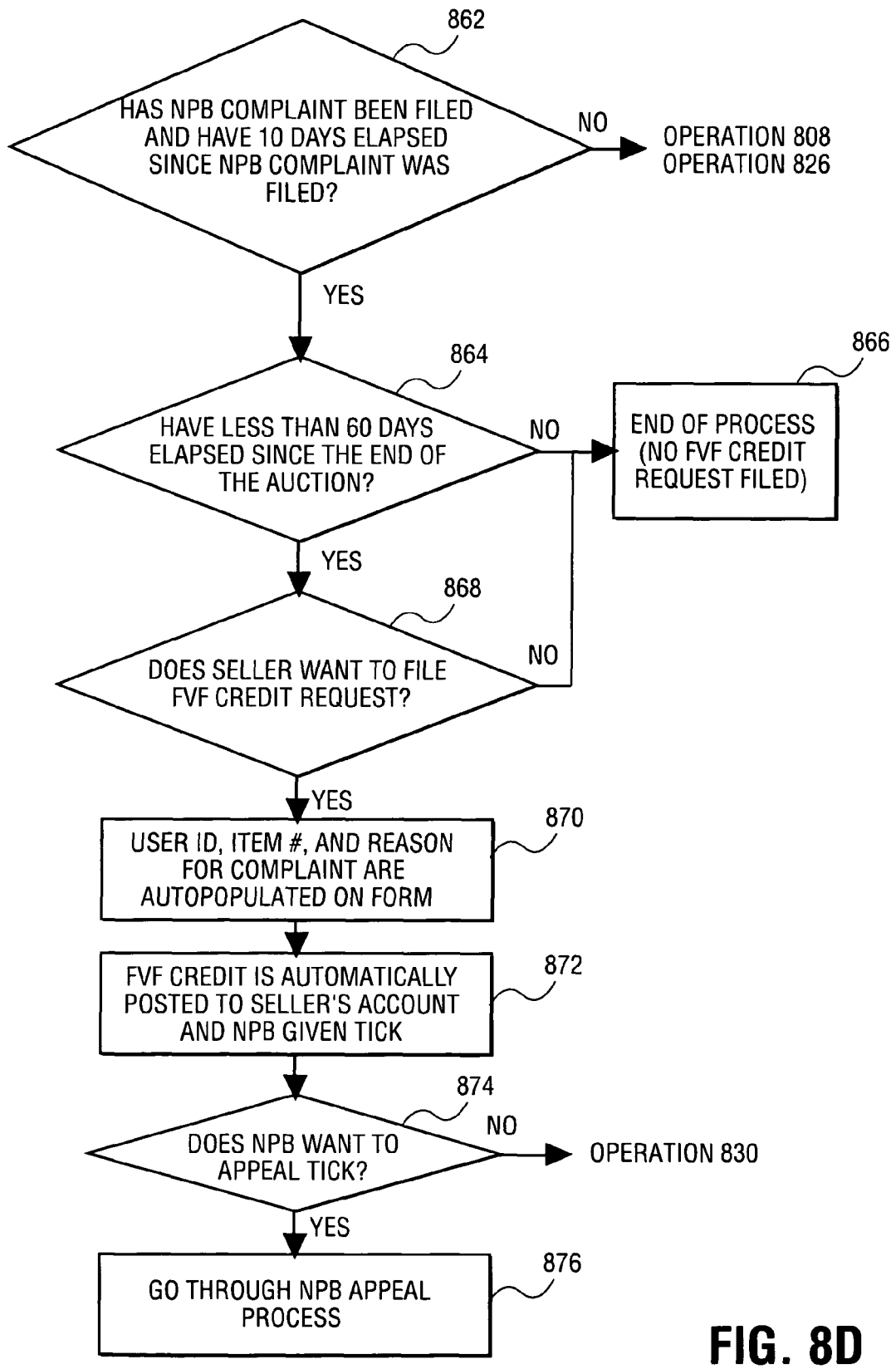

Referring to FIG. 8D, at operation 862, a determination is made if a NPB complaint has been filed and if 10 days have elapsed since the NPB complaint was filed. If not, operation 800 continues to operation 808 if not complaint has been filed and to operation 826 if 10 days have not elapsed.

If a NPB complaint has been field and 10 days or more have elapsed, operation 800 continues to operation 864. At operation 864, a determination is made if less than 60 days have elapsed since the end of the auction. If more than 60 days have elapsed, at operation 866, operation 800 ends and no FVF credit request is filed. Here, approximately two months have passed since the auction, which exceeds a maximum time limit to file a FVF credit request.

If less than 60 days have elapsed since the end of the auction, at operation 868, a determination is made if the seller wants to file a FVF credit request. If the seller does not want to file a FVF credit request, operation 800 ends at operation 866. If the seller does want to file a FVF credit request, at operation 870, the seller is taken to the FVF online credit form such as that shown in interfaces 1102, 1108, or 1120 of FIGS. 11A through 11C. For one embodiment, the user ID, item no., and reason for the complaint are autopopulated on the FVF online form.

At operation 872, after the seller completes the FVF online form, the FVF credit is automatically posted to the seller's account and a NPB tick is given to the NPB. For example, the seller's account can be credited within 24 hours of FVF credit request. The NPB is notified via email that a tick has been given and is given the opportunity to appeal the tick.

At operation 874, a determination is made if the NPB wants to appeal the tick. If the NPB does not want to appeal the tick, operation 800 continues to operation 830. If the NPB does want to appeal the tick, the NPB is taken to an online NPB appeal form such as interface 1202 shown in FIG. 12.

At interface 1202, the NPB is given a window 1204 to enter a user ID and password and a window 1206 to enter the item number. Interface 1202 also provides a window 1208 for the NPB to enter a message on why the tick should not be given to him. After the NPB completes the NPB appeal form, the network-based facility can give the NPB a confirmation such as interface 1302 shown in FIG. 13. Furthermore, the seller and NPB can access an interface 1402 shown in FIG. 14 to determine number of credit requests and NPB tick scores for users.

For one embodiment, the NPB is given a maximum number of ticks (e.g., 3 ticks) before the NPB is suspended from participating in online auctions. If the NPB tick goes from 3 to 2, the NPB can be reinstated. If the FVF credit for the seller is reversed, the NPB tick can later be reversed and the tick can be removed. For another embodiment, the NPB must receive at least three NPB ticks from three different sellers before that bidder is automatically suspended. If, for example, a bidder receives three NPB ticks from Seller A and one NPB tick from Seller B, the bidder should not be automatically suspended (NPB tick score=2). However, the bidder should be flagged so that customer support may manually review the bidder and have the ability to suspend the bidder.

Exemplary Computing System

Figure 15:
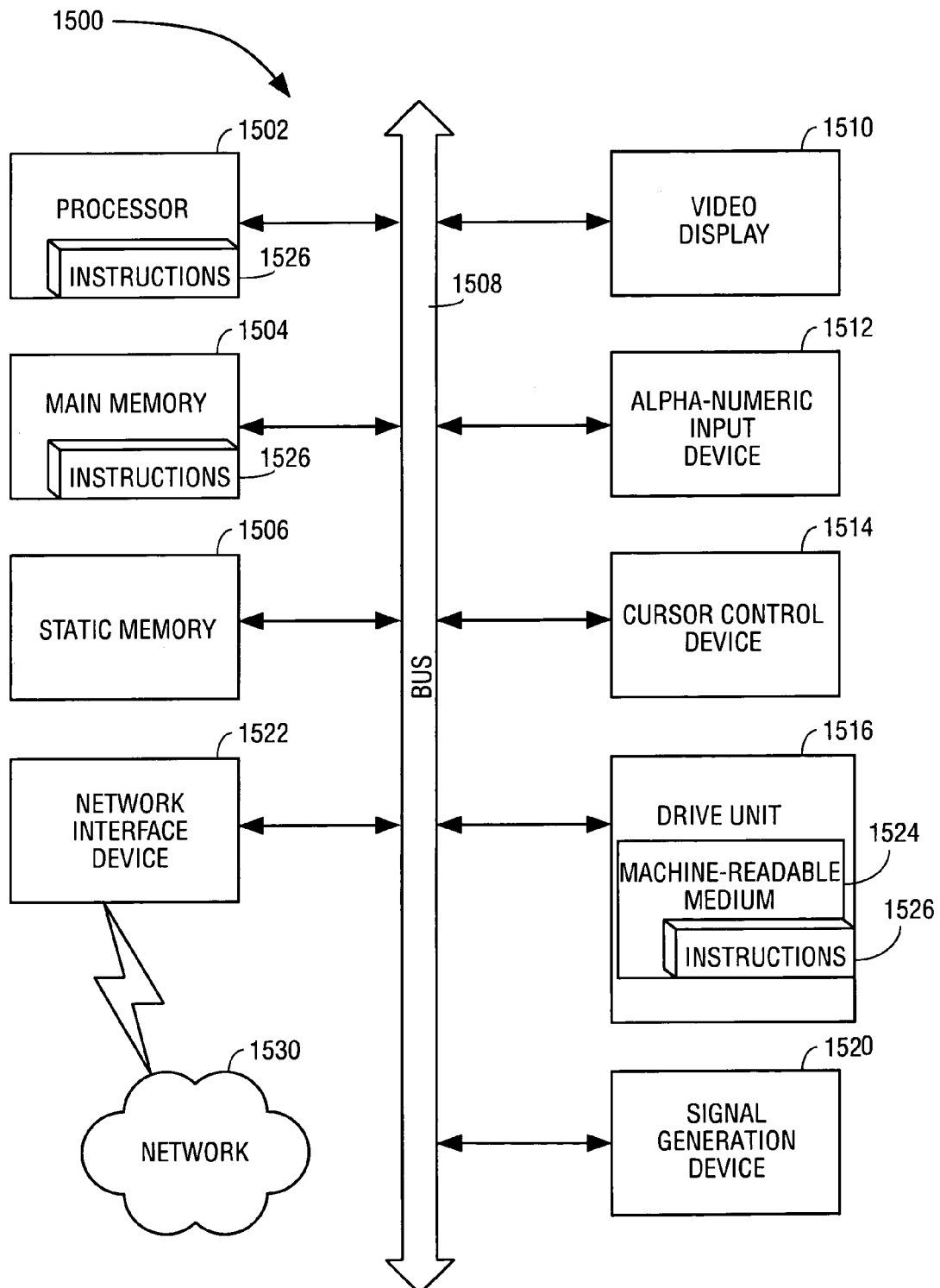
FIG. 15 is a diagrammatic representation of a machine, in an exemplary form of a computer system, in which a set of instructions for causing the machine to perform any of the methodologies of the present invention may be executed.

FIG. 15 is a diagrammatic representation of a machine, in an exemplary form of a computer system 1500, in which a set of instructions for causing the machine to perform any of the methodologies of the present invention may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1500 includes a process 1502, a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alpha-numeric input device 1512 (e.g., a keyboard, a cursor control device 1514 (e.g., a mouse), a disk drive unit 1516, a signal generation device 1520 (e.g., a speaker) and a network interface device 1522.

The disk drive unit 1516 includes a machine-readable medium 1524 on which is stored a set of instructions (i.e., software) 1526 embodying any one, or all, of the methodologies described above. The software 1526 is also shown to reside, completely or at least partially, within the main memory 1504 and/or within processor 1502. The software 1526 may further be transmitted or received via the network interface device 1522. For purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to include, but no limited to, solid-state memories, optical and magnetic disks, and carrier wave signals.

Thus, a method and system for dealing with non-paying bidders related to network-based transactions have been described. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for a network-based facility, the method comprising:
  receiving submission of a complaint at a network-based facility, the complaint being related to a failed transaction that is not completed by a party, the party is a buyer and the transaction is not completed by the buyer for the reason that the buyer failed to send a payment to a seller;
  facilitating, a resolution of the complaint;
  determining, by a processor, the complaint is not resolved;
  at the network-based facility and using one or more processors, updating a record associated with the failed transaction that is not completed by the buyer, the updating the record including incrementing a first count of failed transactions not completed by the buyer for the reason that the buyer failed to send a payment to the seller;
  communicating a user interface to a client machine of a seller, the user interface including a second count of failed transactions not completed by the buyer, the second count including the first count of failed transactions not completed by the buyer for the reason that the buyer failed to send a payment to the seller; and
  updating a seller refund request table upon crediting a fee previously charged to the seller by the network-based facility based on the failed transaction back to the seller.

2. The method of claim 1, further comprising:
  facilitating submission of a refund request for the fee if the complaint is not resolved.

3. The method of claim 2, wherein the facilitating of the submission of the refund request includes:
  providing an interface to facilitate input of information for the refund request.

4. The method of claim 1, wherein facilitating the submission of the complaint includes:
  providing an interface to facilitate input of information for the complaint.

5. The method of claim 1, wherein facilitating the resolution of the complaint includes:
  notifying the party that the complaint has been submitted against the party.

6. The method of claim 1, further comprising:
  determining the first count exceeds a predetermined count value;
  responsive to the determining, suspending the party from participating in future transactions.

7. The method of claim 1, wherein the network-based facility includes a network-based online auction facility and the transaction includes a network-based online auction transaction.

8. A network based facility system comprising:
  a database configured to maintain a plurality of records of network-based transactions, the plurality of records including a first record; and
  a processor configured to facilitate submission of a complaint, the complaint being associated with a first record maintained by the database, the first record relating to a failed transaction that has not been completed by a party for the reason that the buyer failed to send a payment to a seller, the processor to facilitate a resolution of the complaint, the processor configured to determine the complaint is not resolved and to update the first record, the first record indicating a first count of failed transactions that have not been completed by the buyer for the reason that the buyer failed to send a payment to the seller, the processor configured to communicate a user interface to a seller, the user interface includes a second count of failed transactions not completed by the buyer, the second count includes the first count of failed transactions not completed by the buyer for the reason that the buyer failed to send a payment to the seller, the processor configured to update a seller refund request table upon crediting a fee previously charged to the seller by the network-based facility based on the failed transaction back to the seller.

9. The network-based facility of claim 8, wherein the processor is to facilitate submission of a refund request for the fee if the complaint is not resolved.

10. The network-based facility of claim 9, wherein the processor is to provide an interface to facilitate input of information for the refund request.

11. The network-based facility of claim 8, wherein the processor is to provide an interface to facilitate input of information for the complaint.

12. The network-based facility of claim 8, wherein the processor is to notify the party that the complaint has been submitted against the party.

13. The network-based facility of claim 8, wherein the processor is to determine the first count exceeds a predetermined count value; and to suspend the party from participation in future transactions responsive to the determination.

14. The network-based facility of claim 8, wherein the network-based facility includes a network-based online auction facility and the transaction includes a network-based online auction transaction.

15. A non-transitory machine-readable medium that provides instructions, which when executed by a machine, cause the machine to:
 facilitate submission of a complaint to a network-based facility, the complaint being related to a failed transaction that has not been completed by a party, the party is a buyer and the transaction is not completed by the buyer for the reason that the buyer failed to send a payment to a seller;
 facilitate a resolution of the complaint;
 determine the complaint is not resolved;
 update a record associated with the failed transaction that has not been completed by the buyer, the record indicating a first count of failed transactions that have not been completed by the buyer for the reason that the buyer failed to send a payment to the seller;
 communicate a user interface to a seller, the user interface includes a second count of failed transactions not completed by the buyer, the second count includes the first count of failed transactions not completed by the buyer for the reason that the buyer failed to send a payment to the seller; and
 update a seller refund request table upon crediting a fee previously charged to the seller by the network-based facility based on the failed transaction back to the seller.

16. The non-transitory machine-readable medium of claim 15, further comprising instructions, when executed by the machine, cause the machine to:
 determine the complaint is not resolved; and
 facilitate submission of a refund request for the fee.

17. The non-transitory machine-readable medium of claim 16, further comprising instructions, when executed by the machine, cause the machine to:
 provide an interface to facilitate input of information for the refund request.

18. The non-transitory machine-readable medium of claim 15, further comprising instructions, when executed by the machine, cause the machine to:
 provide an interface to facilitate input of information for the complaint.

19. The non-transitory machine-readable medium of claim 15, further comprising instructions, when executed by the machine, cause the machine to:
 notify the party that the complaint has been submitted against the party.

20. The non-transitory machine-readable medium of claim 15, further comprising instructions, when executed by the machine, cause the machine to:
 determine the first count exceeds a predetermined count value; and
 suspend the party to participate in future transactions with the network-based facility.

21. A network-based facility, comprising:
 a first means for maintaining a plurality of records of network-based transactions, the plurality of records including a first record; and
 a second means for facilitating submission of a complaint, the complaint being associated with the first record relating to a failed transaction that has not been completed by a party, the party is a buyer and the transaction is not completed by the buyer for the reason that the buyer failed to send a payment to a seller;
 facilitating a resolution of the complaint;
 determining the complaint is not resolved;
 updating the first record to indicate a count of failed transactions that have not been completed by the buyer, the updating the record including incrementing a first count of failed transactions not completed by the buyer for the reason that the buyer failed to send a payment to the seller;
 communicating a user interface to a seller, the user interface including a second count of failed transactions not completed by the buyer, the second count including the first count of failed transactions not completed by the buyer for the reason that the buyer failed to send a payment to the seller; and
 updating a seller refund request table upon crediting a fee previously charged to the seller by the network-based facility based on the failed transaction back to the seller.

22. The network-based facility of claim 21, wherein the second means is for facilitating submission of a refund request for the fee if the complaint is not resolved.

23. The network-based facility of claim 22, wherein the second means is for providing an interface to facilitate input of information for the refund request.

24. The network-based facility of claim 21, wherein the second means is for providing an interface to facilitate input of information for the complaint.

25. The network-based facility of claim 21, wherein the second means is for notifying the party that the complaint has been submitted against the party.

26. The network-based facility of claim 21, wherein the second means is for determining whether the first count exceeds a predetermined count value; and for suspending the party from participating in future transactions.

27. The network-based facility of claim 21, wherein the network-based facility includes a network-based online auction facility and the failed transaction includes a failed network-based online auction transaction.

28. The method of claim 1, further comprising:
 determining the first count exceeds a predetermined count value; and
 responsive to the determining, communicating a warning to the party of a suspension from participating in future transactions.

29. The method of claim 28, further including receiving an appeal from the party and denying the appeal.

30. The method of claim 28, further including receiving an appeal from a party and granting the appeal.

31. The method of claim 29, further including decrementing the count of failed transactions not completed by the party responsive to the granting of the appeal.

32. The method of claim 1, wherein the second count of failed transactions is based on a number of failed transactions not completed by the buyer for the reason that the buyer sent a payment to the seller that was fraudulent.

33. The method of claim 1, wherein the second count of failed transactions is based on a number of failed transactions not completed by the buyer for the reason that the buyer made a fraudulent payment to the seller.

34. The method of claim 1, wherein the second count of failed transactions is based on a number of failed transactions between the buyer and the seller that are not completed.

35. The method of claim 1, wherein the interface includes a list of failed transactions that are not completed, wherein the failed transactions include the buyer and a plurality of sellers.

* * * * *